United States Patent [19]
Morgan

[11] Patent Number: 5,383,629
[45] Date of Patent: Jan. 24, 1995

[54] EMERGENCY MEDICAL SYSTEM

[75] Inventor: Roy L. Morgan, Franktown, Colo.

[73] Assignee: Air Methods Corporation International, Englewood, Colo.

[21] Appl. No.: 957,694

[22] Filed: Oct. 7, 1992

[51] Int. Cl.$^6$ ............................................. B64D 11/00
[52] U.S. Cl. ................................ 244/118.6; 296/19; 5/610
[58] Field of Search ............... 244/118.1, 118.5, 118.6; 296/19; 5/9.1, 8, 602, 610, 611

[56] References Cited

U.S. PATENT DOCUMENTS

| | | | |
|---|---|---|---|
| 771,039 | 9/1904 | Boecker | 5/610 |
| 943,827 | 12/1909 | Hennessy | 5/610 |
| 3,840,265 | 10/1974 | Stirling et al. | 296/19 |
| 4,178,032 | 12/1979 | Hone | 244/118.1 |
| 4,378,128 | 3/1983 | Holling et al. | 296/19 |
| 4,783,025 | 11/1988 | Moffett | 244/118.5 |

FOREIGN PATENT DOCUMENTS

| | | | |
|---|---|---|---|
| 1491267 | 10/1969 | Germany | 296/19 |
| 1715 | of 1900 | United Kingdom | 296/19 |

*Primary Examiner*—Galen L. Barefoot
*Attorney, Agent, or Firm*—McCubbrey, Bartels & Ward

[57] ABSTRACT

An emergency medical system is disclosed for movably supporting a plurality of patients in a generally rectangular vehicle interior space. Three litter rack systems are disposed on respective walls of the interior space. Each of the litter rack systems is provided with a system for automatically adjusting the vertical position between and tilt of the patient litters in each of the rack systems. Adjustable attendant chairs are placed strategically adjacent the rack systems for attending patients therein.

8 Claims, 10 Drawing Sheets

EMERGENCY MEDICAL SYSTEM

FIELD OF THE INVENTION

This invention relates generally to emergency medical systems for use in emergency vehicles. More particularly, the invention relates to the interior architecture of an air-ambulance.

BACKGROUND OF THE INVENTION

In emergency medical service applications, air-ambulances, such as helicopters, have been used for emergency transfer and treatment of patients. Often such service involves transporting multiple patients and patients requiring immediate attention and treatment.

Various methods have been employed to transport patients in a helicopter. For example, in various medical systems, the patient is placed on a stretcher or litter which is attached to the floor or a fixed bench within the helicopter. These systems have proved unsatisfactory in several respects. First, most of the medical systems have limited patient transport capabilities, i.e., for one patient only. Second, in order for the EMS attendants or paramedics to work on the patient, they must get down on the floor, creating an awkward working posture. Finally, the interior space is generally cramped and the attendants or paramedics in their crouched position generally take up more space than they would while sitting upright.

In order to alleviate the problems associated with the above referenced systems, several medical systems have been employed in helicopter interiors which place the patient(s) at a more comfortable level for the attendants or paramedics to work, as well as freeing up floor space within the emergency vehicle interior. These systems are still, however, quite limited in usefulness and suffer from other considerable drawbacks. For example, some helicopters and/or fixed wing aircraft merely employ a single litter rack system comprising single or multiple tiers of litter racks. Illustrative are the litter rack systems disclosed in U.S. Pat. Nos. 2,483,025, 2,370,402, 2,473,364, 2,480,322 and 3,358,300.

It is therefore an object of the present invention to provide a cabin architecture for the interior of an emergency medical vehicle, such as a helicopter, which employs three litter rack systems in a space efficient and highly effective manner.

BRIEF DESCRIPTION OF THE DRAWINGS

Further features and advantages of the emergency medical system disclosed herein will become apparent from the following and a more particular description of the preferred embodiment of the invention as illustrated in the accompanying drawings, in which.

SUMMARY OF THE INVENTION

The emergency medical system of the present invention substantially reduces or eliminates the disadvantages and shortcomings associated with the prior art. The emergency medical system generally comprises three litter rack systems disposed on a plurality of walls in a generally rectangular vehicle interior space for movably supporting a plurality of patients therein. The litter rack systems include automatic means for adjusting the vertical position between and tilt of the patient litters.

DESCRIPTION OF THE PREFERRED EMBODIMENT

Figure 1:
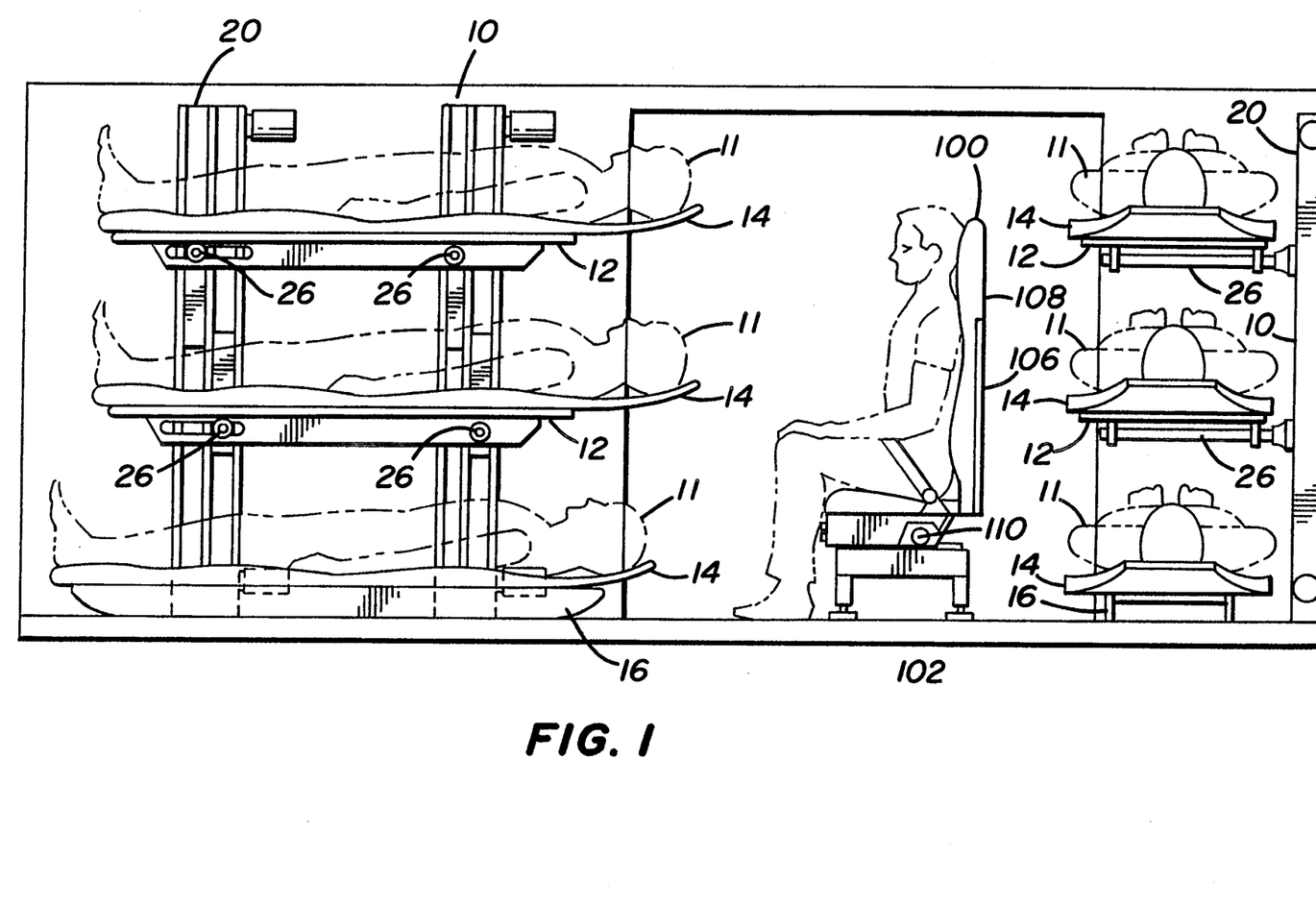
FIG. 1 is a side view of a helicopter interior illustrating the patient transport capabilities of the present invention.
Figure 2:
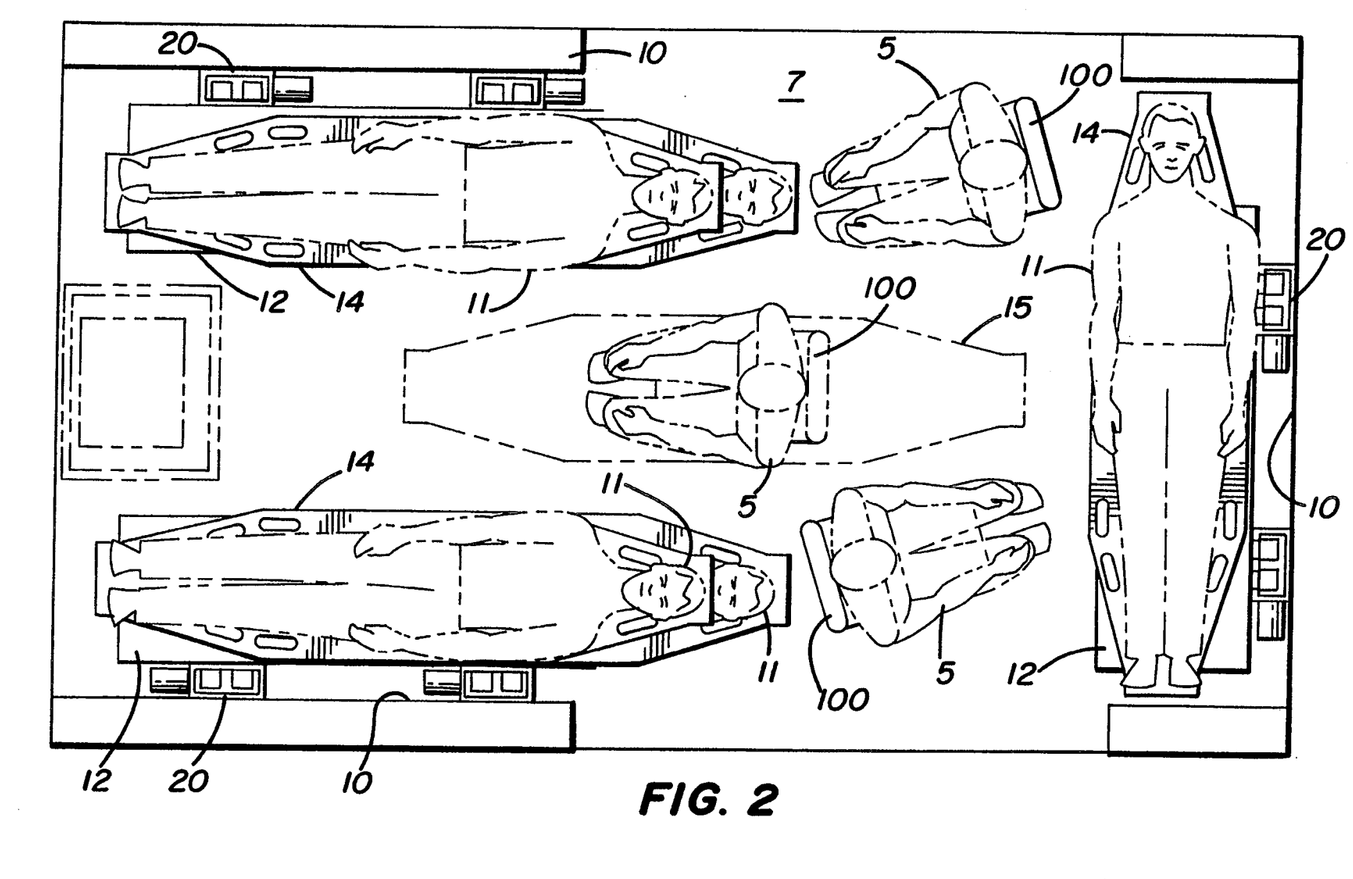
FIG. 2 is a top view of a helicopter interior illustrating the patient transport capabilities of the present invention.

Referring to FIGS. 1 and 2, the emergency medical system of the present invention generally comprises three litter rack systems 10 disposed on a plurality of walls in a generally rectangular vehicle interior space for movably supporting a plurality of patients therein. By the term "vehicle", it is meant to mean an air-ambulance, which may be either a helicopter or fixed wing aircraft, or mechanized ground transport equipment.

According to the invention, the litter rack systems 10 may be either multi-tiered or single-tiered, preferably multi-tiered. Details of the multi-tiered litter rack systems are set forth in co-pending application Ser. No. 07/958,024, filed Oct. 7, 1992.

Figure 4:
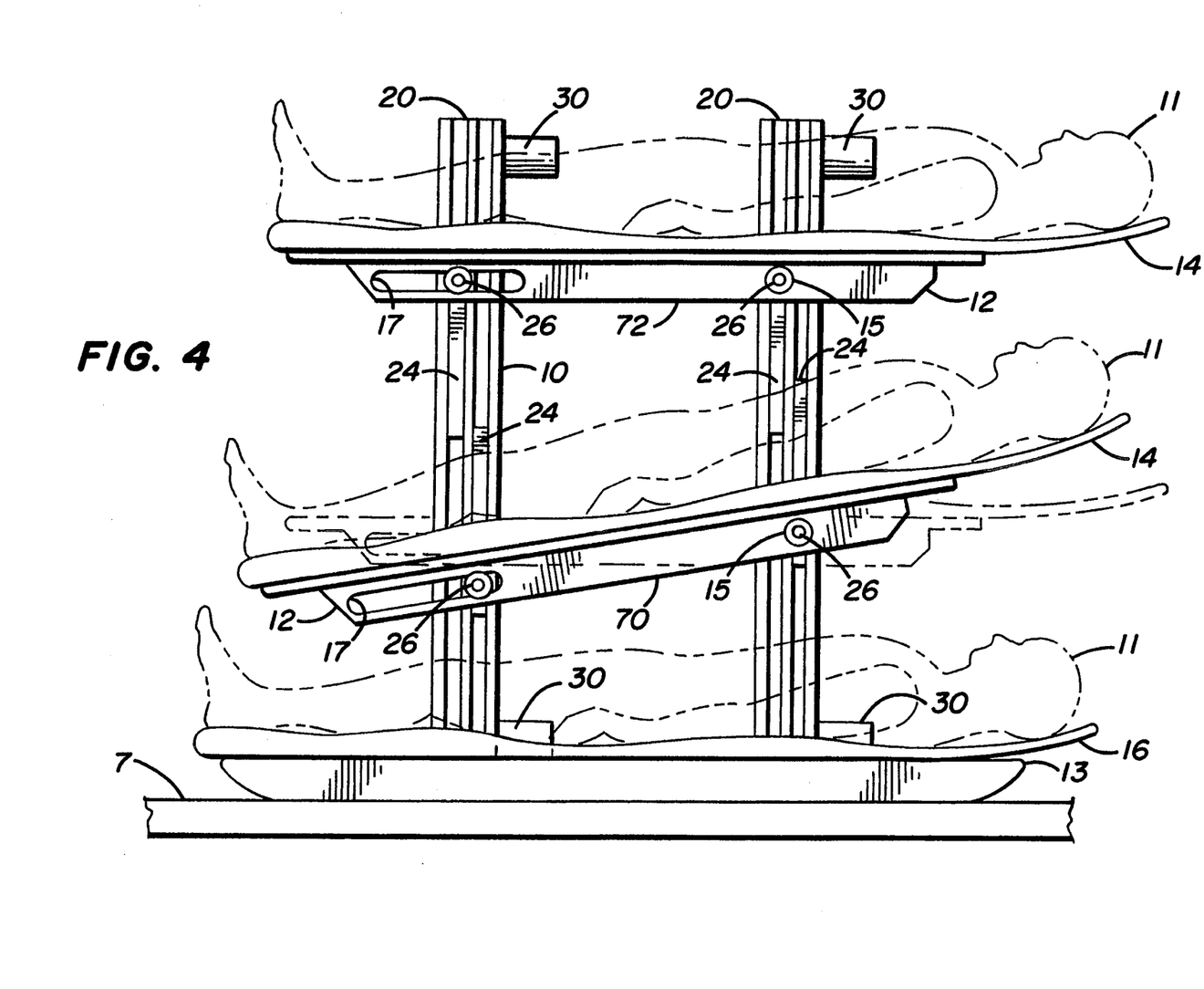
FIG. 4 is a front view of a multi-tiered litter rack system of the present invention.
Figure 5:
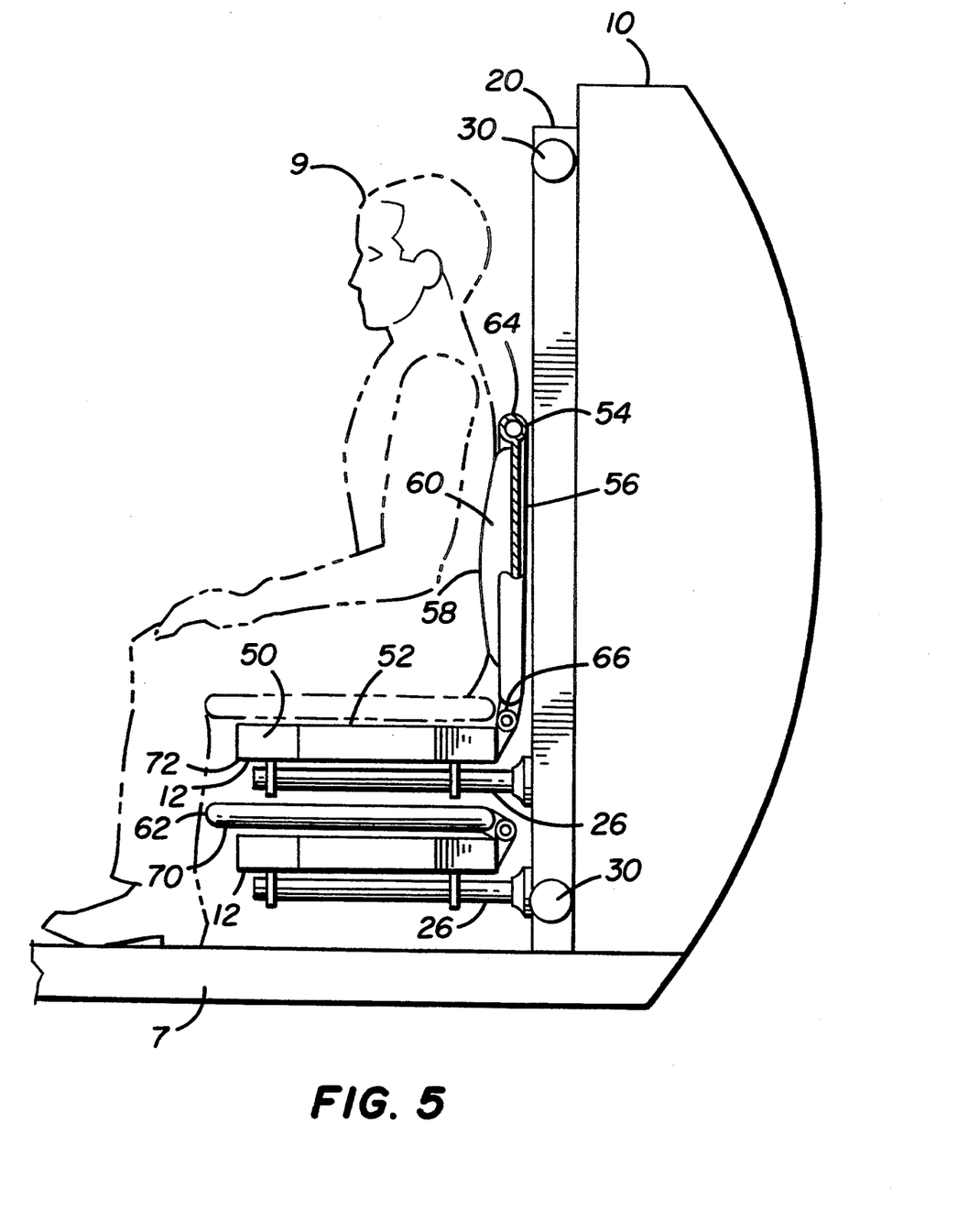
FIG. 5 is a side view of the multi-tiered litter rack system shown in FIG. 4 illustrating the conversion of a litter platform to facilitate seated passenger transport according to the invention.

As stated above, in the preferred embodiment of the invention, three multi-tiered litter rack systems are employed. As illustrated in FIGS. 4 and 5, the preferred multi-tiered litter rack system generally comprises a plurality of support means arranged to support a plurality of vertically spaced litters 14 in at least two horizontally spaced positions. The multi-tiered litter rack system also includes vertical adjustment means which are adapted to independently adjust the vertical position of each of the support means for controlling the tilt of and vertical spacing between the litters 14. The vertical adjustment means include means for operatively mounting the vertical adjustment means to an interior wall of the vehicle. The multi-tiered litter rack system further includes control means which are operatively connected to the vertical adjustment means for controlling the vertical position and tilt of each of the litters 14.

As illustrated in FIG. 4, the multi-tiered litter rack system includes at least two litter platforms 12 (see FIG. 1). Each of the litter platforms 12 is provided with a conventional litter latch (not shown) for engaging and securing a litter 14.

A key feature of the multi-tiered litter rack system is the highly versatile vertical adjustment means. As illustrated in FIG. 5, the vertical adjustment means comprises a pair of substantially parallel, horizontally spaced, vertically elevating control masts 20. Each control mast 20 includes a pair of substantially parallel tracks (not shown) which are disposed within and in parallel relation with each of the control masts 20. The control masts 20 are also adapted to be operatively mounted to the interior wall of the vehicle by conventional means.

The support means of the multi-tiered litter rack system comprises a plurality of lift plates 24 which are adapted to slidably engage the control mast tracks. Each lift plate 24 is also provided with a horizontal support member 26 which is adapted to rotatably engage one of the litter platforms 12 proximate each end thereof.

To receivably engage the horizontal support members 26, the litter platforms 12 include fore and aft support holes 15, 17 which are designed and configured to rotatably receive the horizontal support members 26 (see FIG. 1). To facilitate the tilting of the litter platforms 12 and, thereby, the litters 14, the aft hole 17 of the litter platform 12 comprises an elongated hole. The horizontal support members 26 will thus pivotally engage the fore support hole 15 and slidably engage the aft elongated support hole 17.

To adjust the vertical spacing between and tilting of the litter platforms 12, the vertical adjustment means is further provided with drive means for vertically raising and lowering the lift plates 24 in each of the control mast tracks. The drive means may comprise various power options including electrically operated means, pneumatically operated means or even manually operated means, preferably electrically operated means 30.

In operation, the litter platforms 12 are initially lowered and positioned at an optimum height for loading of the litters 14. The first litter 14, with a patient 11 thereon, is then placed on the top litter platform 72. The litter platform latch (not shown) engages and secures the litter 14 thereon. The litter harness or restraint is then employed to secure the patient 11 to the litter platform 72. The top litter platform 72 is then raised to allow for placement of a second litter 14 on the lower litter platform 70. The second litter 14, with a second patient 11 thereon, is then secured to the lower litter platform 70 in the same manner described above.

Control means, comprising computer logic means, may then be activated to position the platforms 70, 72 in tiered relation. The control means may also comprise a plurality of manually operated switches in circuitry with the electrically operated means 30 and disposed in one or more strategic locations in the vehicle interior. The control means may also be employed to tilt either or both tiered litter platforms 70, 72, thus providing trendelenburg (for intubation, subclavian insertion, patients in shock, and/or cord/placenta previa) and reverse trendelenburg (for pulmonary and head injury) capability for at least two patients 11 in each litter rack system 10.

Figure 5A:
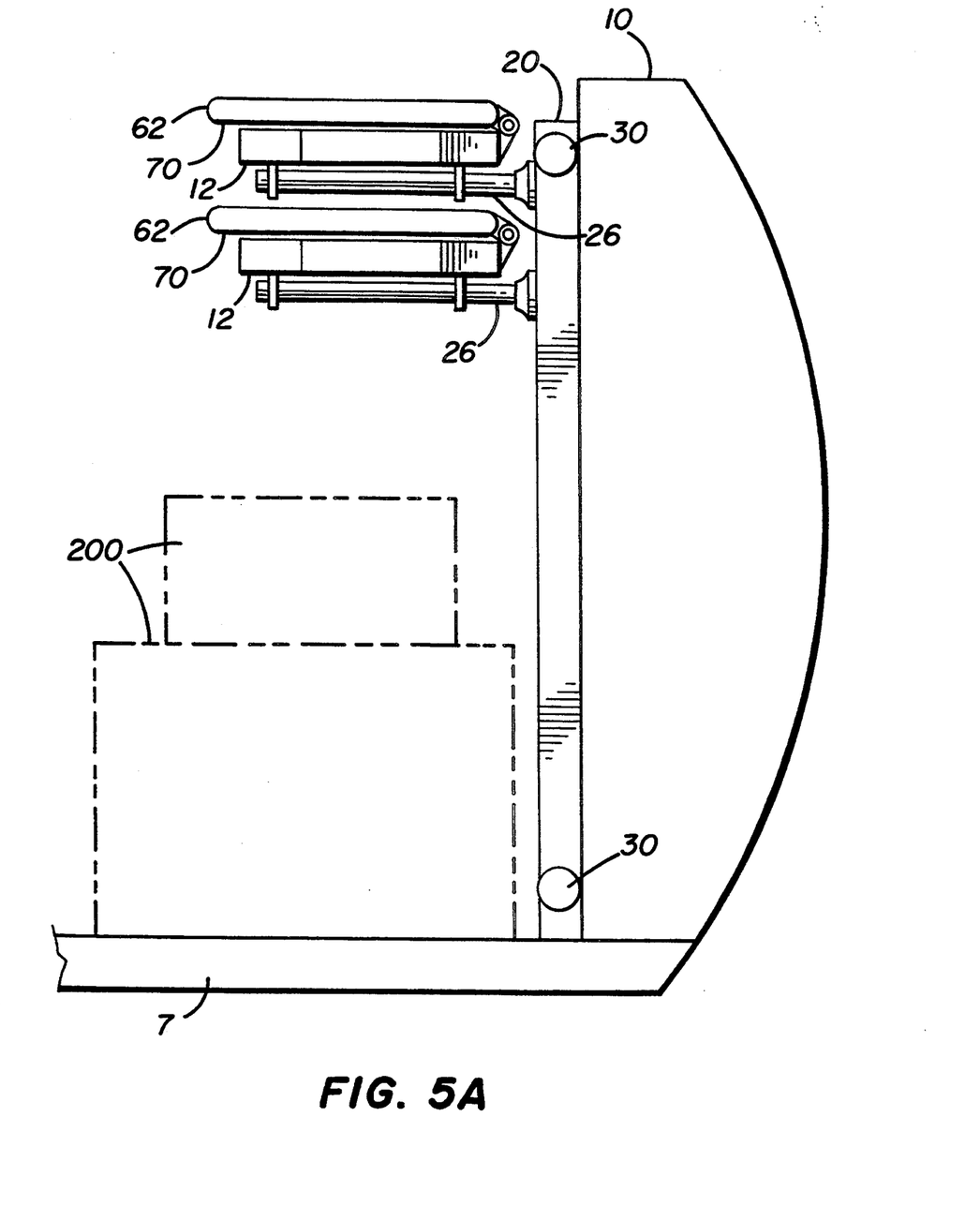
FIG. 5A is a side view of the multi-tiered litter rack system shown in FIG. 4 illustrating the conversion of the litter platforms to facilitate cargo placement and transport.

As further illustrated in FIG. 4, raising both litter platforms 70, 72 also provides the paramedics or attendants with a raised place to work and also allows for a third litter 16 (i.e., patient) to be placed under the litter platforms 70, 72. The litter 16 may be secured directly to the vehicle floor 7 or, as shown in FIG. 4, a mounting pad 13 may be employed to support and secure the litter 16 to the vehicle floor 7. The litter platforms 70, 72 may also be raised completely, as illustrated in FIG. 5A, to allow for cargo 200 placement and transport.

Figure 3:
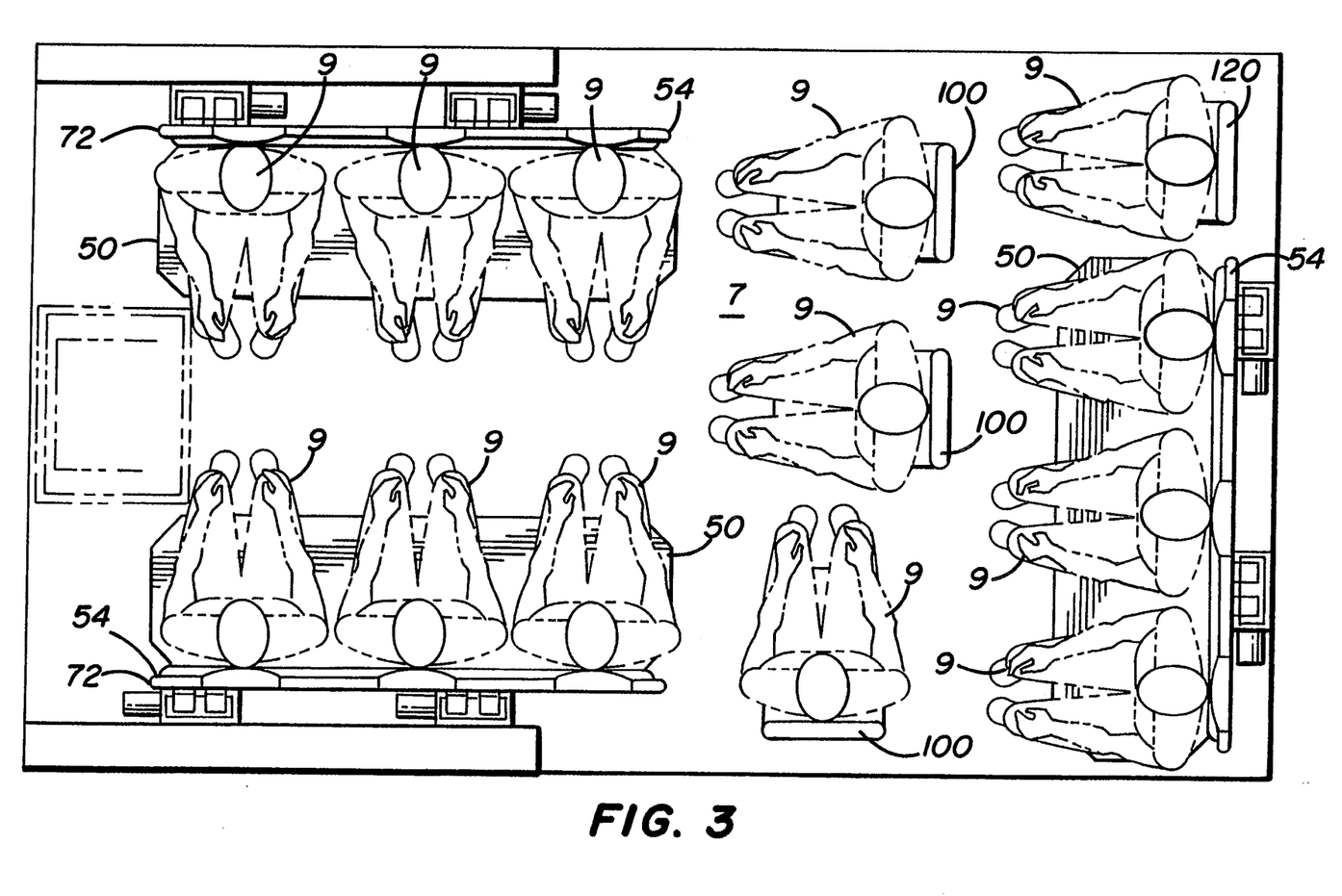
FIG. 3 is a top view of a helicopter interior illustrating the passenger transport capabilities of the present invention.

A further feature of the litter rack system is that the litter platforms 70, 72 also accommodate seated passenger 9 transport as illustrated in FIG. 3. Referring to FIG. 5, at least one of the litter platforms 70, 72, is a two-piece mechanism having a substantially rectangular base portion 50 with a top surface 52 defining a conventionally cushioned horizontal seat portion, and a vertically reciprocatable top portion 54 with a top 56 and bottom 58 surface. The bottom surface 58 has an exposed conventionally cushioned seat back forming portion 60 when the top portion 54 is raised from a horizontal position 62 to a vertical position 64. The two piece litter platform 72 is also provided with a conventional hinge 66 which connects the base 50 and top 54 portions, permitting the top portion 54 to be rotated to and from the vertical position 64. The litter platform 12 is also provided with conventional means for retaining the vertically reciprocatable top portion 54 in the vertical 64 and horizontal positions 62 (not shown).

To provide for additional seated passenger 9 safety and comfort, the upper litter platform 72 may be provided with at least three reciprocatable head support members (not shown) movable between raised and lowered positions. Thus, by appropriately positioning the litter platforms 70, 72, a seated passenger 9 may be positioned in the lower platform 70 with head support provided by the upper platform 72. Additional details of this feature are set forth in the following further embodiment of the invention.

Figure 6:
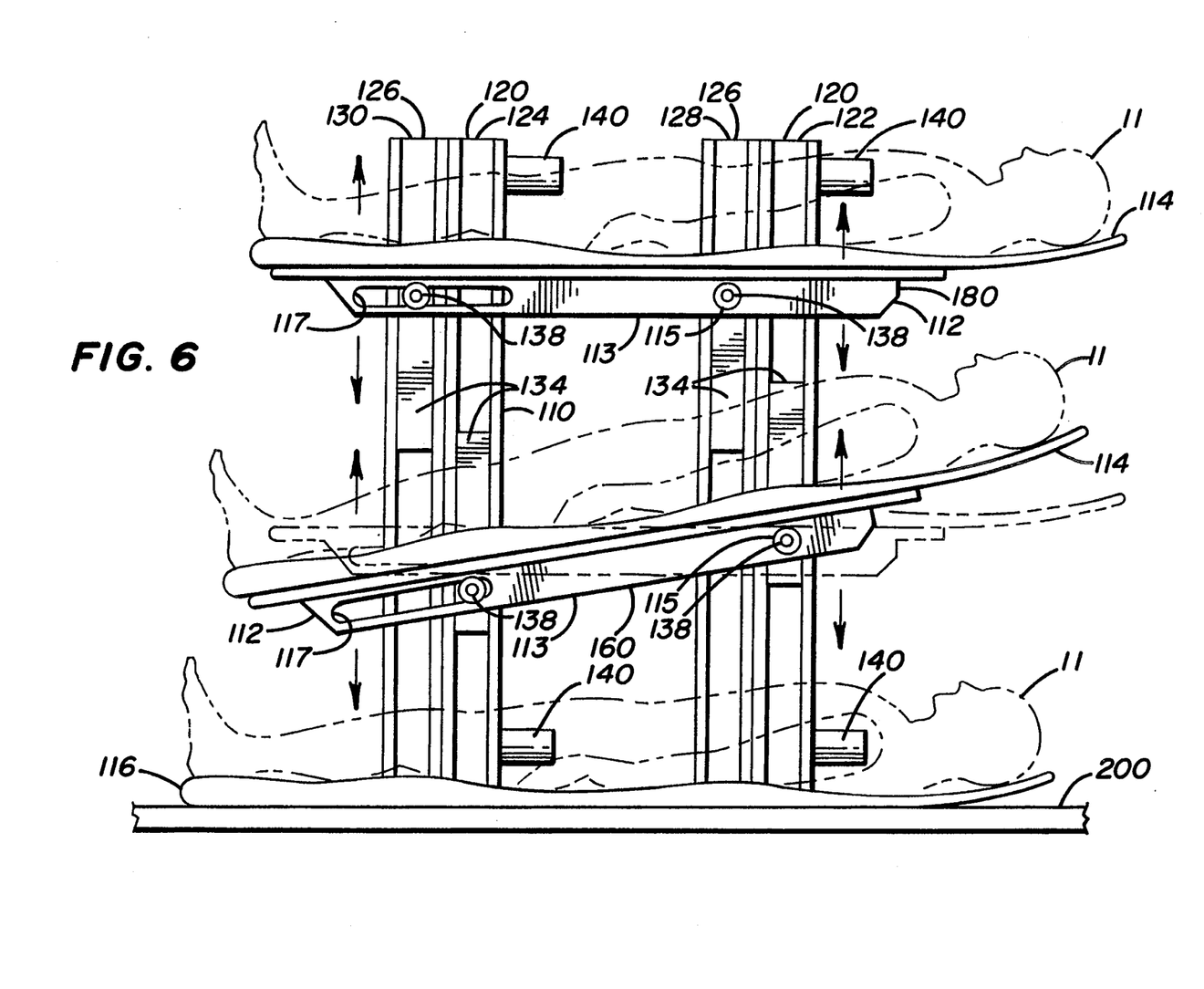
FIG. 6 is a front view of another multi-tiered litter rack system of the present invention.

In a further embodiment of the invention, the multi-tiered litter rack system illustrated in FIG. 6 may be employed. The vertical adjustment means of this multi-tiered litter rack system comprises two pairs of substantially parallel horizontally spaced vertically elevating control masts 120, 126. The first control mast 120 comprises a first fore 122 and a first aft 124 lift beam which are operatively mounted to the interior wall of the vehicle by conventional means. The second control mast 126 similarly comprises a second fore 128 and second aft 130 lift beam which are operatively mounted to the interior wall of the vehicle by conventional means. The second fore 128 and second aft 130 lift beams are positioned on the interior wall of the vehicle such that the second fore 128 and second aft 130 lift beams are in substantially parallel relation with the first fore 122 and first aft 124 lift beams. Each lift beam 122, 124, 128, 130 is also provided with a track (not shown) which is disposed within and in parallel relation with each of the lift beams 122, 124, 128, 130.

The support means of the multi-tiered litter rack system comprises two pairs of fore and aft lift plates 134, 136 which are adapted to slidably engage the lift beam tracks. The first pair of fore and aft lift plates 134 are adapted to engage the first fore 122 and first aft 124 lift beam tracks and the second pair of fore and aft lift plates 136 are similarly adapted to slidably engage the second fore 128 and second aft 130 lift beam tracks. Each of the lift plates 134, 136 are also provided with a horizontal support member 138 which is adapted to rotatably engage one of the litter platforms 112 proximate each end thereof. The support members 138 are further adapted to pivotally engage the litter platforms 112 proximate one end and slidably engage the platforms 112 on the opposite end thereof.

To receivably engage the horizontal support members 138, the litter platforms 112 similarly include fore and aft support holes 115, 117 which are designed and configured to rotatably receive the horizontal support members 138. To facilitate the tilting of the litter platforms 112 and, thereby, the litters 114, the aft hole 117 of the litter platform 112 also comprises an elongated hole.

To adjust the vertical spacing between and tilting of the litter platforms 112, and, thereby, the litters, the vertical adjustment means is further provided with drive means for vertical raising and lowering of the plates 134, 136 in each of the lift beam tracks. The drive means may similarly comprise various power options including electrically operated means, pneumatically operated means or even manually operated means, preferably electrically operated means 140.

In operation, the litter platforms 112 are initially lowered and positioned at an optimum height for loading of the litters 114. The first litter 114 with a patient 11 thereon, is then placed on the top litter platform 180. The litter platform latch (not shown) engages and secures the litter 14 thereon. The litter harness or restraint is then employed to secure the patient 11 to the litter platform 180. The top litter platform 180 is then raised to allow for placement of a second litter 114 on the lower litter platform 160. The second litter 114, with a second patient 11 thereon, is then secured to the lower litter platform 160 in the same manner.

Control means, comprising computer logic means and/or a plurality of manually operated switches in circuitry with each of the motors 140 and disposed in one or more strategic locations in the vehicle interior, are then activated to position the platforms 160, 180 in tiered relation. As illustrated in FIG. 6, the control means may also be employed to tilt either or both tiered litter platforms 160, 180, thus providing trendelenburg (for intubation, subclavian insertion, patients in shock, and/or cord/placenta previa) and reverse trendelenburg (for pulmonary and head injury) capability for at least two patients in each litter rack system 110. The control means also includes a plurality of conventional limit switches operatively connected to the control masts 120, 126 and motors 140 to control and limit the vertical movement of the litter platforms 160, 180.

As further illustrated in FIG. 6, raising both litter platforms 160, 180 also provides the paramedics or attendants with a raised place to work and similarly allows for a third litter 116 (i.e., patient) to be placed on the floor 200 of the vehicle under the litter platforms 160, 180. The litter platforms 160, 180 may also be raised completely (not shown) to allow for cargo placement and transport.

Figure 7:
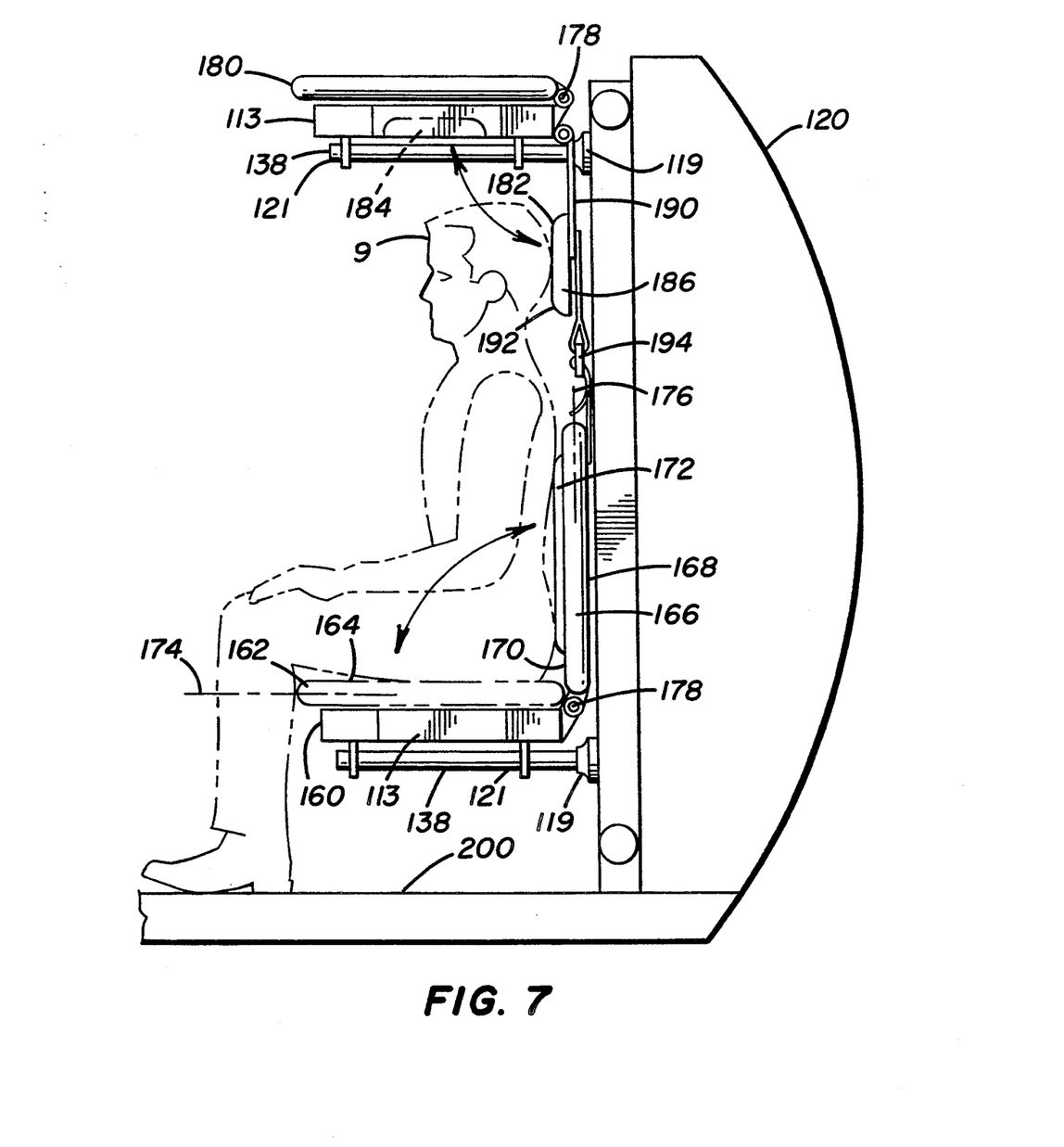
FIG. 7 is a side view of the multi-tiered litter rack system shown in FIG. 6 illustrating the conversion of a litter platform to facilitate seated passenger transport according to the invention.

As illustrated in FIG. 7 the litter platforms 160, 180 of this embodiment similarly accommodate seated passenger 9 transport. The bottom litter platform 160 is generally a two-piece mechanism having a substantially rectangular base portion 162 with a top surface 164 defining a conventionally cushioned horizontal seat portion, and a vertically reciprocatable top portion 166 with a top 168 and bottom 170 surface. The bottom surface 170 has an exposed conventionally cushioned seat back forming portion 172 when the top portion 166 is raised from a horizontal position 174 to a vertical position 176. The two piece bottom litter platform 160 is also provided with a conventional hinge 178 which connects the base 162 and top 166 portions, permitting the top portion 166 to be rotated to and from the vertical position 176. The litter platform 160 is also provided with conventional means for retaining the vertically reciprocatable top portion 166 in the vertical 176 and horizontal positions 174 (not shown). The vertically reciprocatable top portion 166 and the base portion 162 include an interconnected conventional harness or restraint system (not shown) for securing seated passengers 9 therein.

To provide for additional seated passenger 9 safety and comfort, the upper litter platform 180 is provided with at least three reciprocatable head support members 182 which are movable between raised 184 and lowered positions 186. The head support members 182 generally comprise a support member frame 190 and a conventionally cushioned headrest portion 192 disposed on one end thereof.

The head support members 182 are positioned on the upper litter platform 180 on the bottom portion thereof. A plurality of hinges 188, adapted to rotatably engage each of the head support members 182 at the end opposite the headrest portion 192, are operatively mounted to the upper litter platform frame 113 proximate the inside end. The upper litter platform frame 113 is provided with a conventional latch (not shown) to engage and secure the head support members 182 in the raised position 184. The head support members 182 are also provided with a flexible strap 194 operatively mounted to the support member frame 190 and adapted to engage the bottom litter platform 160 top portion 166 when the top portion 166 is raised to the vertical position 176, thereby securing the head support member(s) 182 in the lowered position 186. Thus, when the bottom litter platform 160 top portion 166 is in the raised or vertical position 176, the head support members 182 are in the secured lowered position 186 and the upper and lower litter platforms 160, 180 are appropriately positioned by the electric motors 140, resilient head support is effectively provided to at least three seated passengers 9 positioned in each litter rack system 10.

Figure 8:
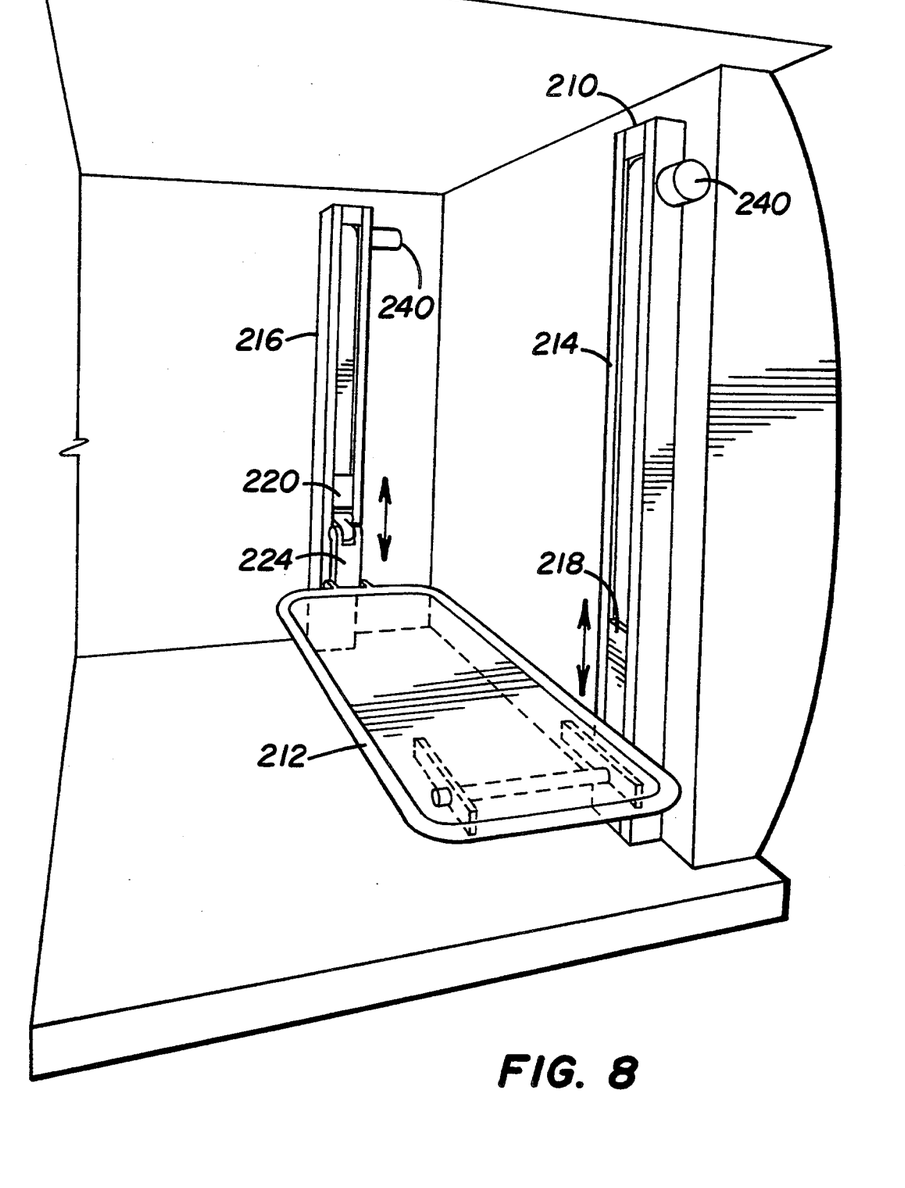
FIG. 8 is a perspective view of a single tiered litter rack system of the present invention.

According to the invention, a single-tiered litter rack system may also be employed. As illustrated in FIG. 8, the single-tiered litter rack system 210 would comprise support means arranged to support a litter (not shown) in at least two spaced positions and vertical adjustment means adapted to adjust the vertical position of the support means for controlling the tilt and vertical position of the litter. The vertical adjustment means would also include means for operatively mounting the vertical adjustment means to at least one interior wall of the vehicle. The single-tiered litter rack system would further include control means which are operatively connected to the vertical adjustment means for controlling the vertical adjustment means and thereby the vertical position and tilt of the litter.

As illustrated in FIG. 8, the single-tiered litter rack system 210 includes at least one litter platform 212. The litter platform 212 is provided with a conventional litter latch (not shown) for engaging and securing the litter.

The vertical adjustment means of the single-tiered rack system 210 comprises a vertically elevating side control mast 214 and a vertically elevating end control mast 216. The side and end control masts 214, 216 include a substantially parallel track (not shown) disposed within and in parallel relation with each of the control masts 214, 216. A key feature of this single-tiered litter rack system 210 is that the side and end control masts 214, 216 are operatively mounted to the interior of the vehicle on substantially perpendicular vertical planes.

Figure 9:
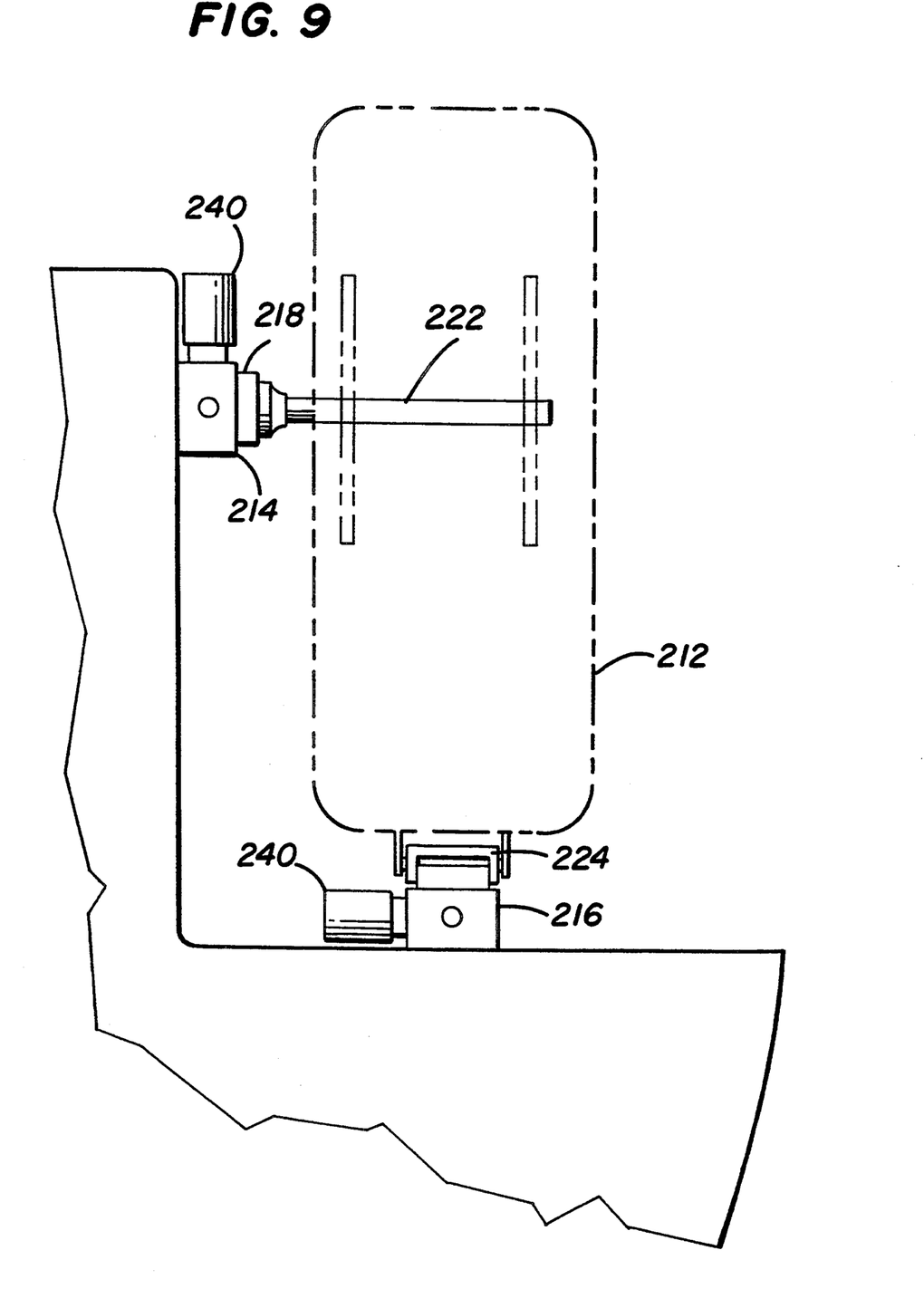
FIG. 9 is a top schematic view of the single tiered litter rack system shown in FIG. 8.

The support means of the single-tiered litter rack system comprises a side lift plate 218 adapted to slidably engage the side control mast track and an end lift plate 220 adapted to slidably engage the end control mast track. The side lift plate 218 includes a horizontal support member 222 adapted to pivotally engage the litter platform 212 on one side thereof (see FIG. 9). The end lift plate 220 is provided with an elongated lift arm 224 having hinge means (not shown) for hingedly connecting one end of the lift arm 224 to the end lift plate 220 and the opposite end of the lift arm 224 to one end of the litter platform 212 permitting the litter platform 212 to be tilted on either end thereof.

The single-tiered litter rack system 210 includes drive means adapted to engage the side and end lift plates 218, 220 for vertically raising and lowering the plates 218, 220 in the side and end control mast tracks. The drive means may comprise various power options including electrically operated means, pneumatically operated means or even manually operated means, preferably electrically operated means 240.

The emergency vehicle medical system of the present invention, in addition to three litter rack systems, would further include from one to three attendant seats 100. In the preferred embodiment, illustrated in FIG. 2, the emergency medical system would include three attendant seats 100. In further embodiments of the invention, an additional attendant seat (i.e., jump seat) 120 could be positioned in the space adjacent the litter rack system disposed on the fore wall 3 of the vehicle interior (see FIG. 3).

In the preferred embodiment, the attendant seats 100 are removably secured to the floor 7 of the vehicle and positioned in the vehicle proximate one end of each litter rack system 10 whereby when the litters 14 are secured in the litter rack system 10 with the patient's head proximate each of the attendant seats 100, a substantial portion of the patient's upper body is readily accessible to each attendant 5. The attendant seats 100 may also be positioned within the helicopter interior to facilitate the placement of an additional patient litter 15 or removed entirely to facilitate cargo transport.

In the preferred embodiment, the attendant seats 100 generally comprise a base 102, a conventionally cushioned horizontal seat portion 104 and a conventionally cushioned seat back portion 106 with an integral head support 108 (see FIG. 1). Each seat 100 is provided with a hinge 110 which connects the horizontal seat portion 104 and seat back portion 106, permitting the seat back portion 106 to recline to a horizontal position.

The base 102 includes conventional means for 360" rotation and linear translation of the seats 100. The attendant seats 100 are also provided with a conventional harness or restraint system (not shown) for securing the seated attendants 5.

The employment of three litter rack systems according to the invention would thus provide for emergency care and transport of at least nine patients and three EMS technicians or attendants (see FIGS. 1 and 2). The system further provides transport capability for at least thirteen seated passengers (see FIG. 3). If the folding jump seat 120 is included in the vehicle interior, as shown in FIGURE 3, the system could accommodate an additional seated passenger 9 or EMS attendants 5.

In addition, the emergency medical system of the present invention may provide for transportation of two isolettes, a just delivered mother and her babies in the isolettes, and four EMS attendants 5. The system also has the ability to transport search and rescue victims and stores litters at any height position to deliver patient care or effective CPR.

As will be recognized by one skilled in the art, due to the minimal space requirements of the litter rack system, all medical supplies and equipment may be installed within proximity to the flight team is fingertips for added convenience, easing the delivery of patient care.

Without departing from the spirit and scope of this invention, one of ordinary skill can make various changes and modifications to the invention to adapt it to various usages and conditions. As such, these changes and modifications are properly, equitably, and intended to be, within the full range of equivalents of the following claims.

What is claimed is:

1. An emergency medical system for a vehicle interior space having a ceiling, a floor, and a pair of oppositely disposed walls, said system comprising,
   a pair of substantially parallel horizontally spaced control masts mounted to each of the oppositely disposed walls, each of said control masts having a pair of substantially parallel tracks;
   a pair of elongated litter support platforms arranged to extend along each of the oppositely disposed walls;
   a pair of support assemblies positioned, respectively, toward opposite ends of each of said litter platforms, each of said support assemblies being slideably engaged with a respective one of said lift tracks to permit independent raising and lowering of each end of each of said litter support platforms;
   vertical adjustment means for independently adjusting the vertical position of each of said support assemblies for controlling the vertical spacing between said litter support platforms,
   each pair of said litter support platforms on the respective walls being positionable to provide space for litter supported patients on each of said platforms with room for a third litter supported patient on the floor beneath the lowermost litter support platform,
   each of said litter support platforms on the respective walls being positionable adjacent each other proximate the ceiling to provide clearance for cargo stacked on the floor,
   each of the lowermost one of said litter support platforms on the respective walls having reciprocable seat forming means thereon for configuring said litter support platform as a bench-like passenger seat; and
   an attendant seat removably secured to the floor substantially midway between the opposite walls proximate one end of said litter support platforms, the lowermost of said litter platforms on opposite walls being spaced from each other and from said attendant seat so as to be positionable to locate patients within arm's reach of an attendant seated in said attendant seat.

2. The emergency medical system of claim 1 wherein said litter support platforms include means for engaging and securing a litter thereon.

3. The emergency medical system of claim 1 wherein said support assemblies are adapted to pivotally engage said litter support platforms on one end thereof and slideably engage said platforms on the opposite end thereof whereby said litter support platforms are permitted to tilt on either end.

4. The emergency medical system of claim 3 including powered control means operatively connected to said vertical adjustment means for controlling said vertical adjustment means and thereby the vertical position of said litter support platforms.

5. An emergency medical system for a vehicle interior space having a ceiling, a floor, a rear wall, and a pair of oppositely disposed walls, said system comprising,
- a pair of substantially parallel horizontally spaced control masts mounted to the rear wall and each of the oppositely disposed walls, each of said control masts having a pair of substantially parallel tracks;
- a pair of elongated litter support platforms arranged to extend along the rear wall and each of the oppositely disposed walls;
- a pair of support assemblies positioned, respectively, toward opposite ends of each of said litter platforms, each of said support assemblies being slideably engaged with a respective one of said lift tracks to permit independent raising and lowering of each end of each of said litter support platforms;
- vertical adjustment means for independently adjusting the vertical position of each of said support assemblies for controlling the vertical spacing between said litter support platforms,
- each pair of said litter support platforms on the respective walls being positionable to provide space for litter supported patients on each of said platforms with room for a third litter supported patient on the floor beneath the lowermost litter support platform,
- each of said litter support platforms on the respective walls being positionable adjacent each other proximate the ceiling to provide clearance for cargo stacked on the floor,
- each of the lowermost one of said litter support platforms on the respective walls having reciprocable seat forming means thereon for configuring said litter support platform as a bench-like passenger seat; and
- an attendant seat removably secured to the floor proximate said litter platforms on the rear wall substantially midway between the opposite walls proximate one end of said litter support platforms on the opposite walls, the lowermost of said litter platforms on the rear and opposite walls being spaced from each other and from said attendant seat so as to be positionable to locate patients within arm's reach of an attendant seated in said attendant seat.

6. The emergency medical system of claim 5 wherein said litter support platforms include means for engaging and securing a litter thereon.

7. The emergency medical system of claim 5 wherein said support assemblies are adapted to pivotally engage said litter support platforms on one end thereof and slideably engage said platforms on the opposite end thereof whereby said litter support platforms are permitted to tilt on either end.

8. The emergency medical system of claim 7 including powered control means operatively connected to said vertical adjustment means for controlling said vertical adjustment means and thereby the vertical position of said litter support platforms.

* * * * *